(12) United States Patent
Faruque et al.

(10) Patent No.: US 9,994,167 B2
(45) Date of Patent: Jun. 12, 2018

(54) ACTIVE VEHICLE INTERIOR TRIM PANEL WITH ACCORDION FOLD

(71) Applicant: FORD GLOBAL TECHNOLOGIES, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/157,003

(22) Filed: May 17, 2016

(65) Prior Publication Data

US 2017/0334368 A1 Nov. 23, 2017

(51) Int. Cl.
*B60R 21/213* (2011.01)
*B60R 13/02* (2006.01)
*B60R 21/231* (2011.01)

(52) U.S. Cl.
CPC .......... *B60R 13/025* (2013.01); *B60R 21/213* (2013.01); *B60R 21/231* (2013.01); *B60R 21/23138* (2013.01); *B60R 2013/0287* (2013.01)

(58) Field of Classification Search
CPC . B60R 21/23138; B60R 21/213; B60R 21/21; B60R 2021/21531
See application file for complete search history.

(56) References Cited

U.S. PATENT DOCUMENTS

| 5,382,051 | A | * | 1/1995 | Glance | B60R 13/025 280/730.2 |
|---|---|---|---|---|---|
| 5,447,326 | A | * | 9/1995 | Laske | B60R 21/0428 280/728.3 |
| 5,615,914 | A | * | 4/1997 | Galbraith | B60R 19/205 280/730.2 |
| 5,931,493 | A | * | 8/1999 | Sutherland | B60R 21/215 280/730.1 |
| 6,241,278 | B1 | | 6/2001 | Roote et al. | |
| 6,712,385 | B2 | * | 3/2004 | Enders | B60R 21/206 280/730.1 |
| 6,874,811 | B2 | * | 4/2005 | Enders | B60R 21/206 280/730.1 |
| 7,581,749 | B2 | | 9/2009 | Robins | |

(Continued)

FOREIGN PATENT DOCUMENTS

| JP | 06227340 A | 8/1994 |
|---|---|---|
| JP | 082358 A | 1/1996 |
| JP | 2005125946 A | 5/2005 |

OTHER PUBLICATIONS

English Machine Translation of JP06227340A.
(Continued)

*Primary Examiner* — James A English
(74) *Attorney, Agent, or Firm* — Vichit Chea; King & Schickli, PLLC

(57) ABSTRACT

An active trim panel is for covering at least a portion of a pillar in a vehicle interior. The panel may include a body for covering the portion of the pillar. The body includes at least one accordion fold for expanding from a first position with the body closer to the pillar to a second position with the body spaced from the pillar as a result of the expansion of the accordion fold.

17 Claims, 3 Drawing Sheets

(56) References Cited

U.S. PATENT DOCUMENTS

| | | | |
|---|---|---|---|
| 8,336,910 B1* | 12/2012 | Kalisz | B60R 13/0243 |
| | | | 280/730.1 |
| 8,491,008 B2* | 7/2013 | Roychoudhury | B60R 21/235 |
| | | | 280/752 |
| 8,544,876 B2* | 10/2013 | Best | B60R 21/02 |
| | | | 280/730.1 |
| 9,302,642 B2 | 4/2016 | Faruque et al. | |
| 2005/0023802 A1* | 2/2005 | Enders | B60R 21/206 |
| | | | 280/728.2 |
| 2005/0116447 A1 | 6/2005 | Ryu | |
| 2006/0214400 A1* | 9/2006 | Enders | B60R 21/231 |
| | | | 280/730.1 |
| 2007/0052219 A1* | 3/2007 | Rust | B60R 21/0428 |
| | | | 280/730.2 |
| 2011/0133435 A1* | 6/2011 | Sadr | B60R 21/13 |
| | | | 280/730.1 |
| 2014/0028052 A1 | 1/2014 | Diaz et al. | |

OTHER PUBLICATIONS

English Machine Translation of JP082358A.
English Machine Translation of JP2005125946A.
Don Sherman; "Pedestrian and Inflatable A-Pillar Airbags Explained"; Car and Driver; http://www.caranddriver.com/features/pedestrian-and-inflatable-a-pillar-airbags-explained-tech-dept; Aug. 2012 Issue; pp. 1-3.

* cited by examiner

US 9,994,167 B2

ACTIVE VEHICLE INTERIOR TRIM PANEL WITH ACCORDION FOLD

TECHNICAL FIELD

This document relates generally to the motor vehicle field and, more particularly, to an active vehicle trim panel with one or more accordion folds.

BACKGROUND

Trim panels are typically used in vehicle interiors to cover structures, such as wiring and the vehicle frame, and thus provide an aesthetically pleasing appearance to the occupants. In one particular region along the front, or A-pillar, of the vehicle and the rail extending along the roof line, the trim may be used to cover structures, such as the inner surface of the pillar, electrical wiring or a side curtain air bag, but a sufficient space between the trim and any components is often required to minimize the effect of an impact with occupant head (which space may be at least partially occupied by foam). This may increase the size and resulting projection of the trim into the passenger compartment, which can reduce the interior space or head room and potentially even decrease visibility as a result.

Thus, a need is identified for a trim panel that minimizes the amount of space occupied in the vehicle interior without compromising the desire for spacing the trim panel from any covered components to cushion against possible interior head impacts.

SUMMARY

In accordance with the purposes and benefits described herein, an apparatus for covering at least a portion of a pillar in a motor vehicle interior is provided. In one embodiment, the apparatus comprises a trim panel including a body for covering the portion of the pillar. The body has at least one accordion fold for expanding from a first position with the body closer to the pillar to a second position with the body spaced from the pillar as a result of the expansion of the accordion fold.

In one embodiment, the body includes a plurality of accordion folds, such as pleats, separated by a non-folded portion of the body. The non-folded portion may be rounded or contoured for facing the automobile interior. The trim panel body may include a portion adapted for connecting to the pillar, and the accordion fold may be adjacent to the connecting portion.

An inflator may also be provided for expanding the trim panel from the first position to the second position. A portion of the body including the accordion folds has a first length in the first position of the body and a second length greater than the first length in the second position of the body, which may be expanded as a result of the inflator. The trim panel may comprise a flexible plastic material to allow for the expansion of the accordion fold to occur in the desired manner.

According to another aspect of the disclosure, an apparatus for covering at least a portion of a pillar in a motor vehicle interior includes a trim panel including a fixed width portion at least partially covering the portion of the pillar. The fixed width portion is arranged for moving from a first position closer to the pillar to a second position spaced farther away from the pillar, while the trim panel at all times remains connected to the pillar.

The trim panel may include an accordion fold capable of expanding to allow the fixed width portion to move from the first position to the second position. An inflator may be provided for moving the fixed width portion from the first position to the second position. The fixed width portion may include a curved or rounded outer surface for facing the motor vehicle interior.

Still a further aspect of the disclosure pertains to an apparatus for covering at least a portion of a pillar in a motor vehicle interior. The apparatus comprises a trim panel for covering the portion of the pillar. The trim panel includes a non-expandable portion connected to an expandable portion adapted for allowing the non-expandable portion to move from a first position closer to the pillar to a second position spaced farther away from the pillar as a result of the expansion of the expandable portion.

In one embodiment, the expandable portion comprises an accordion fold for allowing the non-expandable portion to move from the first position to the second position. An inflator may also be provided for moving the non-expandable portion from the first position to the second position. The non-expandable portion may include a curved or rounded outer surface for facing the motor vehicle interior.

In the following description, there are shown and described several preferred embodiments of the active trim panel. As it should be realized, the arrangement is capable of other, different embodiments and its several details are capable of modification in various, obvious aspects all without departing from the active trim panel as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the active trim panel and together with the description serve to explain certain principles thereof. In the drawing figures.

Reference will now be made in detail to the present preferred embodiments of the active trim panel, examples of which are illustrated in the accompanying drawing figures.

DETAILED DESCRIPTION

Figure 1:
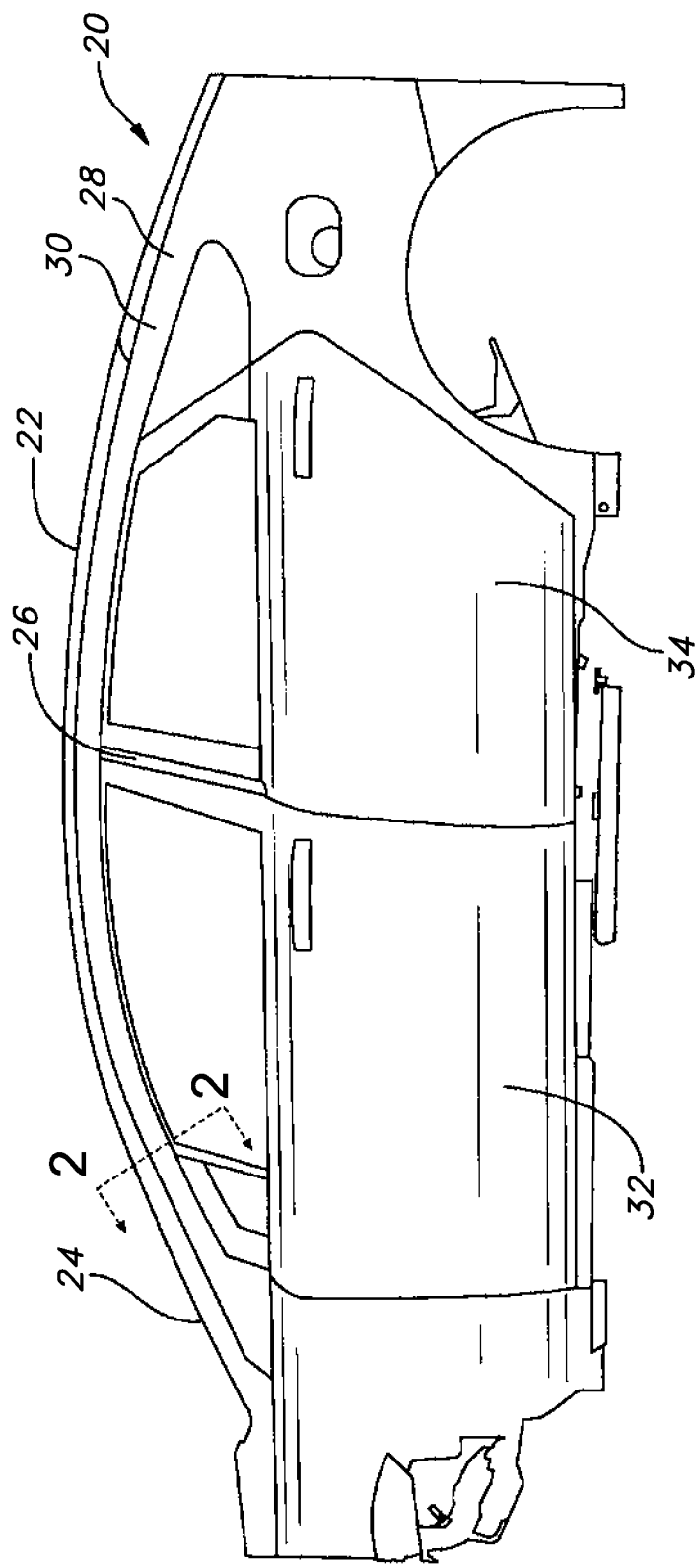
FIG. 1 is a side schematic view of a vehicle to which the present disclosure may be applicable.
Figure 2:
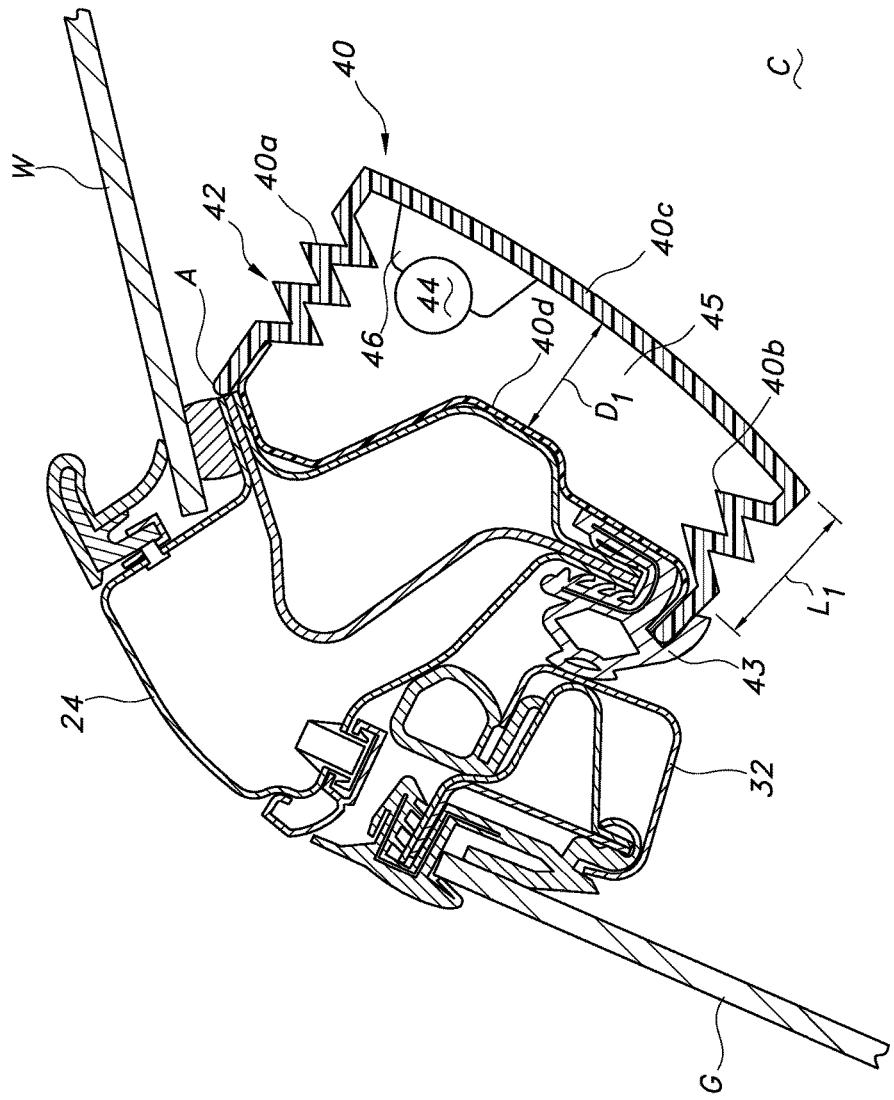
FIG. 2 is a cross-sectional view along line 2-2 of FIG. 1, illustrating the trim panel in an inactive or non-expanded state.
Figure 3:
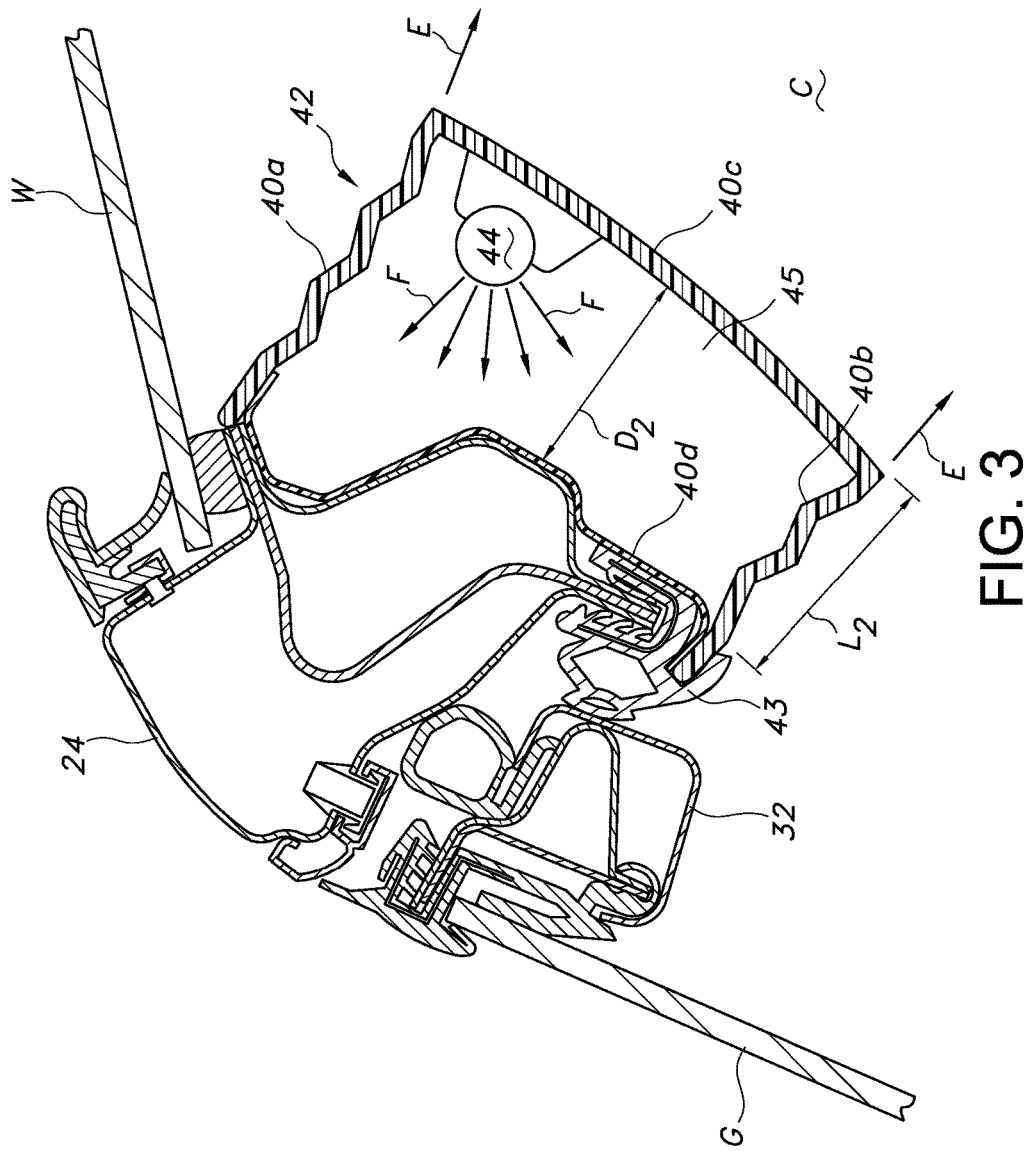
FIG. 3 is a view similar to FIG. 2 illustrating the trim panel in an active or expanded state.

Reference is now made to FIGS. 1, 2, and 3, which illustrate a vehicle 20 including a front or "A" pillar 24 for supporting and interfacing with adjacent structures, such as a windshield W, roof panel 22, and doors 32, 34 (which may also include glass windows G). The vehicle 20 may also include a vertical or "B" pillar 26, as well as a rear or "C" pillar 28. Each pillar 24, 26, 28 may form portions of the outer body panel 30.

FIG. 2 is a cross-sectional taken along line 2-2 of FIG. 1. As can be understood, the A-pillar 24 may be associated with a trim panel 40, which faces the interior passenger compartment C. The trim panel 40 may be attached to and supported by the pillar 24, such as by connectors 43 or by using an adhesive A. The trim panel 40 may extend along all or any portion of the pillar 24, and thus at least partially covers it and spaces it from the interior compartment C in the mounted position.

According to one aspect of the disclosure, the active trim panel 40 may be provided with a generally U-shaped, elongated body including one or more expandable portions. In one particular embodiment, as shown in FIG. 2, two expandable portions each comprise repeating, accordion-style folds 42 or pleats to allow for expansion and retraction of the panel under certain circumstances (which folds are exaggerated for purposes of illustration). Thus, for instance, as shown in FIG. 2, the panel 40 includes a first or upper expandable portion 40a having three folds adjacent to the point of connection to the pillar 24 by adhesive, and a second or lower portion 40b having two folds. However, it is possible to provide any number of folds 42, depending on the particular circumstances, and also to provide folds on only the first or second portion 40a, 40b of the trim panel 40.

Intermediate the expandable portions 40a, 40b is a central portion 40c of the trim panel 40. This central portion 40c connects the expandable portions 40a, 40b, but itself is not expandable or folded. Thus, the central portion 40c may be of a fixed size and dimension, such as width (that is, the dimension between portions 40a, 40b). This allows the trim panel 40 to present a consistent uninterrupted face along the interior compartment 45, which may be desirable for aesthetic reasons. This exposed face of the intermediate or central portion 40c may be generally curved or rounded in contour, and may be provided with a coloring or covering (e.g., fabric) that matches the vehicle interior.

The trim panel 40 may also include a closing portion 40d, which is behind the central portion 40c. This closing portion 40d may cover the pillar 24 and form a cavity or interior compartment 45 within the trim panel 40. Thus, the trim panel 40 may include a continuous cross-section, as shown in FIGS. 2 and 3.

The trim panel 40 may also include an inflator 44 for activating the trim panel to move from a non-expanded or folded state to an expanded state. In one embodiment, the inflator 44 may be positioned in the compartment defined between the trim panel 40 and the associated pillar, such as the A pillar 24. Inflator 44 may be integrated with the active plastic trim as shown in FIG. 2 (note connector 46). The inflator 44 may be attached to a cavity molded in the inside surface of the trim panel 40, such as on connector 46.

The inflator 44 may be connected to onboard battery and crash sensors by electrical wiring. The inflator 44 may thus be activated in the event of a crash to deploy the active plastic trim panel 40. When activated, the inflator 44 generates explosive gas through chemical reaction which is then fed inside the trim to expand the foldable or expandable portions 40a, 40b. Alternatively, the inflator 44 may be filled with a pressurized fluid, such as any compressed inert gas or air.

Once activated, the inflator 44 releases the compressed gas inside the trim panel 40. This produces an outwardly directed force (note arrows F) that cause the trim panel 40 to activate and expand (note arrow E). As can be appreciated, this causes the accordion folds 42 to at least partially expand, and thus trim panel portions 40a, 40b lengthen in a direction toward the interior compartment C (note length $L_2$ of portion 40b in FIG. 3, versus length $L_1$ in FIG. 2), but the trim panel 40 remains connected to the associated pillar 24. Consequently, the central portion 40c moves a distance $D_2$ that is farther away from the pillar 24 relative to an initial distance $D_1$ prior to the expansion of the accordion folds 42 forming the expandable portions 40a, 40b. The resulting increased spacing, plus the shock-absorbing function of the now-expanded accordion folds 42, allows for the trim panel 40 to soften any resulting impact against the pillar 24 by a person in the interior compartment of the vehicle 20. Yet, the roominess of the interior compartment C and visibility of the driver or passenger is enhanced with the panel 40 in the non-expanded, folded configuration.

As noted above, the panel 40 may be connected to the pillar 24 by a mechanical connector (including possibly a "Christmas tree" type of arrangement), but other forms of connection, such as heat staking, an adhesive, or the like may be used. The portions of the panel 40a, 40b, 40c may also be a unitary structure, or separate components that are connected together. The panel 40 may be made of a molded, flexible plastic material, such as for example, thermoplastic olefin. The size and number of the accordion folds provided in portion 40a or 40b may be selected based on the desired expansion and the particular properties or materials used, as well as for aesthetic reasons (e.g., to minimize visibility to passengers). The expandable trim panel 40 may also be used with any part of the vehicle, including on the B or C pillars 26, 28, without limitation.

In summary, numerous benefits are provided by providing an active trim panel 40 according to the disclosure. As a result of the inclusion of the one or more expandable portions 40a, 40b, and a fixed width or non-expandable portion 40c (as well as an optional backing or closing panel 40d to form a compartment for an inflator 44), the panel 40 provides a measure of increased safety by creating a cushioning effect relative to an associated pillar 24, 26, 28 or combination thereof, without compromising the desire for a low-profile arrangement when the increased cushioning effect is not needed, and without impacting the roominess of the interior compartment. As can be appreciated from the foregoing, the expandable portions 40a, 40b of the trim panel 40 may be implemented in various forms using existing materials and techniques, and thus offer a ready solution to increase safety for vehicle passengers.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for covering a pillar in an automobile interior, comprising:
   a trim panel including a body having an accordion fold for expanding from a first position with a portion of the body closer to the pillar to a second position with the portion of the body spaced from the pillar; and
   an inflator located within the body;
   wherein the inflator is attached to a cavity molded in an inside surface of the trim panel.

2. The apparatus of claim 1, wherein the body includes a plurality of accordion folds positioned on spaced legs extending from a non-folded portion of the body, each leg including a free end for connecting the trim panel to the pillar.

3. The apparatus of claim 2, wherein the non-folded portion is rounded or curved for facing the automobile interior.

4. The apparatus of claim 1, wherein the body has a U-shaped cross-section, which U-shaped cross-section includes a connecting portion adapted for connecting to the pillar, and a pair of legs extending from the connecting portion, at least one of the legs including the accordion fold.

5. The apparatus of claim 1, further including a connector within the cavity of the body for connecting the body to the inflator.

6. A vehicle including the apparatus of claim 1, wherein the trim panel is connected to an A-pillar.

7. An apparatus for covering at least a portion of a pillar in an automobile interior, comprising:
- a trim panel including a fixed width portion covering the portion of the pillar, the fixed width portion arranged for moving from a first position closer to the pillar to a second position spaced farther away from the pillar and having a curved or rounded outer surface for facing the automobile interior; and
- an inflator located within the trim panel, the fixed width portion bounding a cavity in which the inflator is located.

8. The apparatus of claim 7, wherein the trim panel includes an accordion fold for allowing the fixed width portion to move from the first position to the second position.

9. The apparatus of claim 7, further including a connector for connecting the inflator to an interior surface of the fixed width portion of the trim panel.

10. A vehicle including the apparatus of claim 7, wherein the trim panel is connected to an A-pillar.

11. The apparatus of claim 7, wherein the inflator is connected by a connector to the fixed with portion of the trim panel.

12. The apparatus of claim 8, wherein the trim panel has a U-shaped cross-section, which U-shaped cross-section includes a pair of legs extending from the fixed width portion, at least one of the legs including the accordion fold.

13. The apparatus of claim 7, wherein the inflator is attached to a cavity molded in an inside surface of the trim panel.

14. An apparatus for covering a pillar in a vehicle interior, comprising:
- a trim panel for at least partially covering the pillar, the trim panel including a non-expandable portion connected to an expandable portion adapted for allowing the non-expandable portion to move from a first position closer to the pillar to a second position spaced farther away from the pillar;
- an inflator; and
- a connector connecting the inflator to the non-expandable portion of the trim panel;
- wherein the non-expandable portion includes a curved or rounded outer surface for facing the vehicle interior, the non-expandable portion bounding a cavity in which the inflator is located.

15. The apparatus of claim 14, wherein the expandable portion comprises an accordion fold for allowing the non-expandable portion to move from the first position to the second position.

16. A vehicle including the apparatus of claim 14, wherein the trim panel is connected to an A-pillar.

17. The apparatus of claim 14, wherein the inflator is attached to a cavity molded in an inside surface of the trim panel.

* * * * *

UNITED STATES PATENT AND TRADEMARK OFFICE
CERTIFICATE OF CORRECTION

PATENT NO. : 9,994,167 B2
APPLICATION NO. : 15/157003
DATED : June 12, 2018
INVENTOR(S) : Mohammed Omar Faruque et al.

It is certified that error appears in the above-identified patent and that said Letters Patent is hereby corrected as shown below:

In the Claims

Column 5, Line 30, please replace "with" with ---"width"---.

Signed and Sealed this
Fourteenth Day of August, 2018

Andrei Iancu
*Director of the United States Patent and Trademark Office*